J. A. EASON.
SWITCH THROWING DEVICE.
APPLICATION FILED NOV. 22, 1911.
1,065,227.
Patented June 17, 1913.
2 SHEETS—SHEET 1.
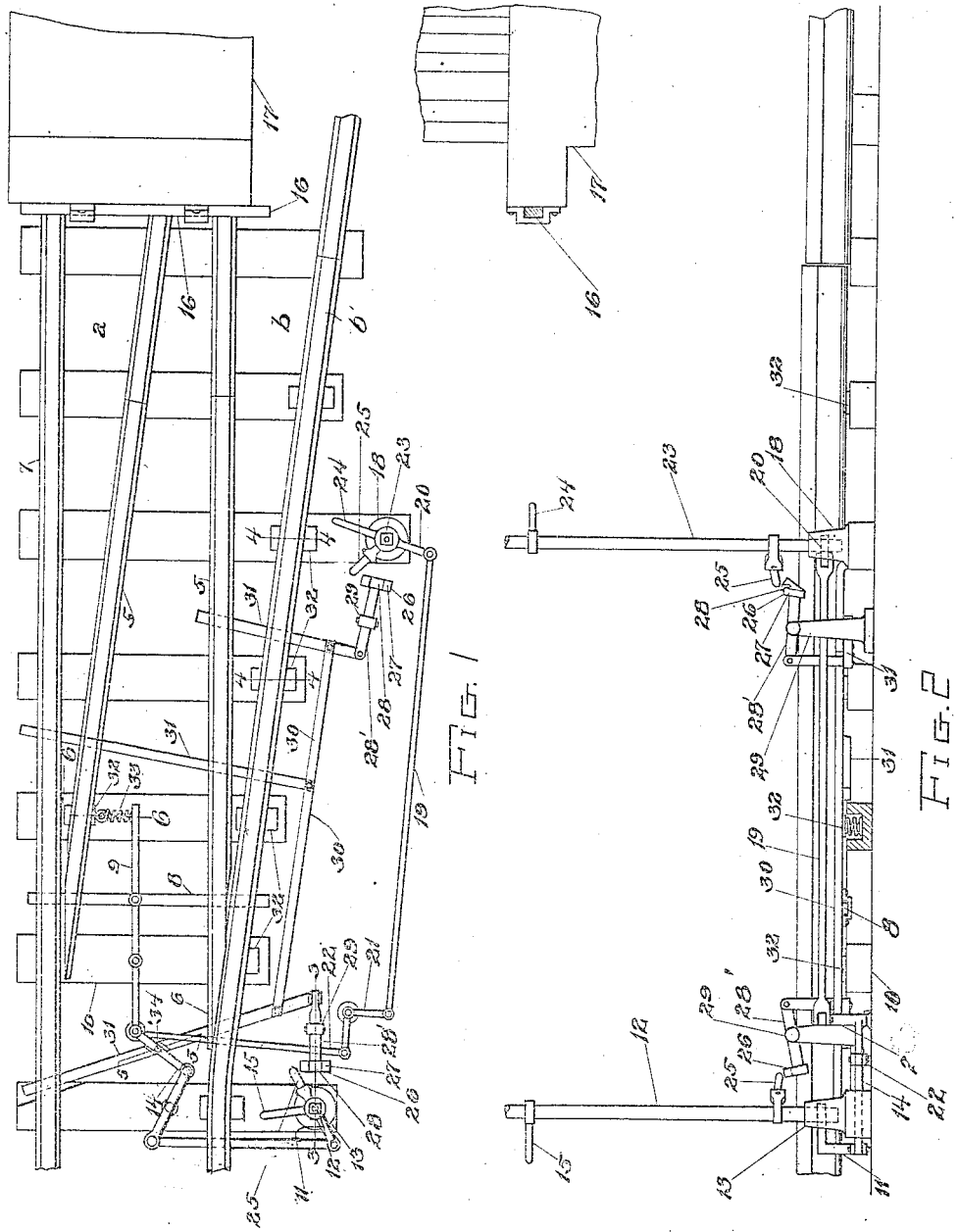
Witnesses
Inventor
J. A. Eason.
By Victor J. Evans
Attorney

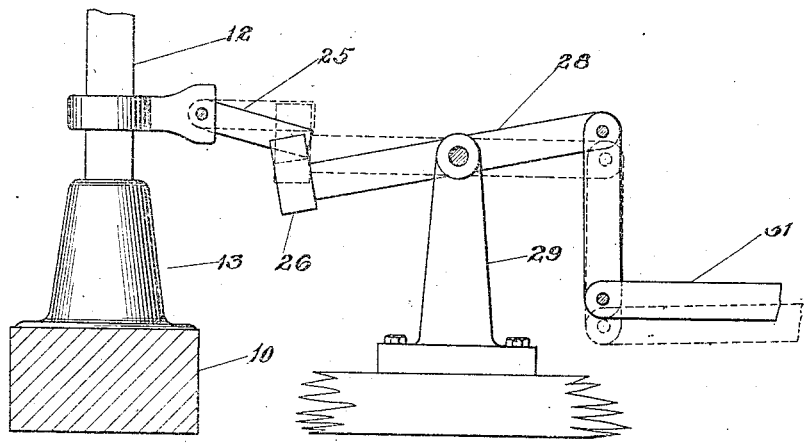
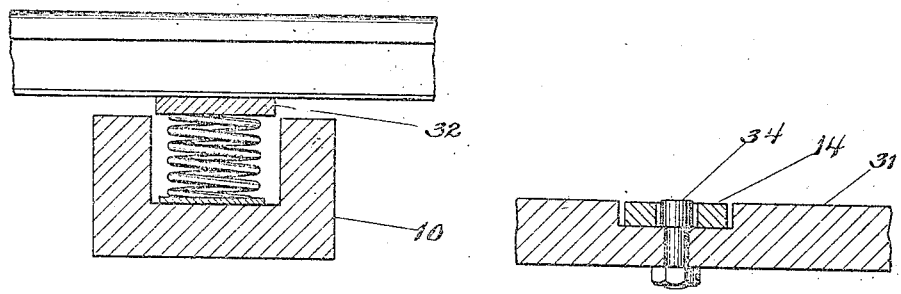

UNITED STATES PATENT OFFICE.

JAMES A. EASON, OF CALHOUN CITY, MISSISSIPPI.

SWITCH-THROWING DEVICE.

1,065,227.  Specification of Letters Patent.  Patented June 17, 1913.

Application filed November 22, 1911. Serial No. 661,771.

*To all whom it may concern:*

Be it known that I, JAMES A. EASON, a citizen of the United States, residing at Calhoun City, in the county of Calhoun and State of Mississippi, have invented new and useful Improvements in Switch-Throwing Devices, of which the following is a specification.

The general object of the invention is to so construct a switch and a car that the latter can, when it is desired to have the same pass onto a switch, automatically operate the switch to open it; thus obviating the practice of having a train-hand precede the car to be switched and set the switch for the car to pass thereonto, and moreover, eliminating the employment of regular switchmen at switches which are frequently operated.

Other objects will appear and be better understood from the following description taken in connection with the accompanying drawings, in which, Figure 1 is a plan of the device. Fig. 2 is a detail side elevation, with the car removed. Fig. 3 is a detail section approximately on the line 3—3 of Fig. 1, showing by full lines the position of the parts before the switch has been thrown and by dotted lines the position of the parts after the switch has been thrown. Fig. 4 is a detail vertical section taken through one of the track rails and on either of the lines 4—4 of Fig. 1. Fig. 5 is a detail section of the lock taken approximately on the line 5—5 of Fig. 1.

The switch points 5—5 coact in the ordinary manner with the main rail 7 to direct the car wheels to follow the main track $a$, or to direct the said car wheels onto the switch $b$. The cross bar 8 which connects the points 5—5 is operated by the lever 9 fulcrumed on the cross tie 10, and the lever in turn is connected by a link 14 to the crank 11 at the lower end of the turning bar 12 of the switch stand 13 which is located to one side of the main track $a$. The turning bar 12 has an arm 15 which extends into the path of a block 16 that may be projected laterally from the car 17.

The foregoing parts are operated when the car approaches the switch stand and the block 16 is projected so as to engage with the arm 15. By virtue of the movement of the car the block will now turn the arm, whereupon the switch points will be thrown to open the main track $a$. In order to enable the car to pass from the switch $b$ onto the main track $a$ I provide a second switch stand 18 and connect, by means of a link 19, the crank 20 of the switch stand 18, with a bell crank 21, which in turn is connected by means of a link 22 with the lever 9. The turning arm 23 of the switch stand 18 has an arm 24 which extends into the path of movement of the block 16 on the car so that when the said block moves the arm 24, the switch points will be operated through the link and lever connections and in the manner previously described.

For effectively locking the switch points against movement during the operation of switching a car or train of cars, I preferably provide the turning bars of the switch stand with locking arms 25—25 which are pivotally connected to the locking bars for limited vertical movement. The relative positions of the locking bars and arms 15 and 24 are such that when the said arms 15 and 24 extend outwardly so as to be engaged by the block on the car, the locking bars 25—25 will be moved to one side of the keepers 26—26. The keepers 26—26 have inclined side portions 27—27 and notches 28—28. The keepers are normally below the pivoted points of the lock arms 25—25 and they have rods 28'—28' which are fulcrumed on bearings 29—29, the said rods being connected together by a stringer 30 and also connected to arms 31—31 which extend under the switch and main track rails and are connected to these elements in any preferred or mechanical manner. The rail $b'$ of the switch or siding at points adjacent one of the main track rails bear upon spring supported plates 32. The said plates are arranged in the cross ties 10 as shown in detail in Fig. 4, whereby the rail member $b'$ will be depressed under the weight of the car and this downward movement of the said rail member $b'$ will operate to rock the keepers upwardly into the path of movement of the lock arms 25—25. It will be observed that this upward movement of the keepers will take place before the car contacts with the arm which turns the turning arm of the switch stand so that when the car operates to turn the switch stand the lock arm 25 thereof will be turned and over-ride one of the inclined sides 27 of the keeper until it alines with the notch 28, whereupon it will descend into the notch and, thus effectively lock the switch points against movement until the car or cars, as the case may be, have passed beyond the spring supported rail section $b'$, whereupon the said rail will move upwardly under the action of its springs and the keepers moved from engagement with the lock arms. When the parts are so positioned the switch points will be restored to their original positions under the action of a spring 33 connected to one end of the lever 9 and at its opposite end to the angle iron bracket 33' as clearly shown in Fig. 6 of th drawings. In their normal positions the parts are locked against accidental movement and until the rails have been depressed by means of a pin 34 carried by one of the arms 31 and adapted to enter an opening in the link 14, all of which is shown in Fig. 5.

Although I have shown and described one embodiment of my invention it is to be understood that I am not to be limited to the specific arrangement and construction of parts since various changes may be made, within the scope of the appended claims without departing from the spirit or sacrificing any of the advantages of the invention.

What I claim as new is:

1. In a switch operating mechanism, the combination with a member projecting from a car; of movable switch points, mechanism for throwing switch points and arranged to be operated by the member projecting from the car, yieldingly supported switch member, and keepers connected to the rail elements and movable into position to engage with the operating mechanism after the same has been operated by the member projecting from the car.

2. In a switch operating mechanism, the combination with a member projecting from a car; of movable switch points, mechanism for throwing switch points and arranged to be operated by the member projecting from the car, yieldingly supported switch member, pivoted keepers, and means connected to the rail members for moving the keepers into engagement with the throwing mechanism after the latter has been operated by the member projecting from the car.

In testimony whereof I affix my signature in presence of two witnesses.

JAMES A. EASON.

Witnesses:
JAMES J. ADAMS,
J. J. BYARS.